(12) United States Patent
Bittar et al.

(10) Patent No.: US 12,152,488 B2
(45) Date of Patent: Nov. 26, 2024

(54) LOOK-AHEAD RESISTIVITY CONFIGURATION

(71) Applicant: Halliburton Energy Services, Inc., Houston, TX (US)

(72) Inventors: Michael S. Bittar, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 344 days.

(21) Appl. No.: 17/497,457

(22) Filed: Oct. 8, 2021

(65) Prior Publication Data

US 2022/0025763 A1 Jan. 27, 2022

Related U.S. Application Data

(62) Division of application No. 16/606,696, filed as application No. PCT/US2018/062641 on Nov. 27, 2018, now Pat. No. 11,174,727.

(51) Int. Cl.
*E21B 49/00* (2006.01)
*E21B 7/04* (2006.01)
(Continued)

(52) U.S. Cl.
CPC ............. *E21B 49/00* (2013.01); *E21B 7/04* (2013.01); *E21B 44/00* (2013.01); *G01V 3/30* (2013.01); *G01V 3/38* (2013.01); *G01V 11/00* (2013.01)

(58) Field of Classification Search
CPC .. E21B 7/04; E21B 44/00; G01V 3/30; G01V 3/38
See application file for complete search history.

(56) References Cited

U.S. PATENT DOCUMENTS 5,469,062 A * 11/1995 Meyer, Jr. ............... G01V 3/30
  702/9
5,678,643 A * 10/1997 Robbins ................... E21B 7/04
  175/45

(Continued)

FOREIGN PATENT DOCUMENTS

WO 2011129828 10/2011
WO 2014098806 6/2014

OTHER PUBLICATIONS

Ma et al. "Successful Geostopping Using a Recently Developed Look-Ahead Ultra-Deep EM Resistivity Tool" SPE-211613-MS (Year: 2022).*

(Continued)

*Primary Examiner* — John Fitzgerald
(74) *Attorney, Agent, or Firm* — Benjamin Ford; C. Tumey Law Group PLLC (57) ABSTRACT

A system and a method for a look-ahead drill bit. The system may comprise an ultra-deep transmitter operable to transmit a low frequency signal into a formation, a shallow tool operable to transmit a high frequency signal into the formation, at least one ultra-deep receiver operable to record a reflected low frequency signal, and at least one pair of collocated receivers, wherein the at least one pair of collocated receivers are operable to record a reflected high frequency signal. A method may comprise transmitting a high frequency signal from the shallow tool into the formation, transmitting a low frequency signal from the ultra-deep transmitter into the formation, evaluating the reflected high frequency signal and the reflected low frequency signal on an information handling system with a look-ahead inversion, and steering the bottom hole assembly in the formation based on the subterranean formation property.

18 Claims, 4 Drawing Sheets

(51) Int. Cl.
  *E21B 44/00* (2006.01)
  *G01V 3/30* (2006.01)
  *G01V 3/38* (2006.01)
  *G01V 11/00* (2006.01)

(56) References Cited

U.S. PATENT DOCUMENTS

| | | | |
|---|---|---|---|
| 6,594,584 B1 | 7/2003 | Omeragic et al. | |
| 6,703,837 B1 | 3/2004 | Wisler et al. | |
| 7,366,616 B2 | 4/2008 | Bennett et al. | |
| 8,089,268 B2* | 1/2012 | Wang | G01V 3/28 |
| | | | 324/338 |
| 8,463,549 B1* | 6/2013 | Selman | E21B 7/04 |
| | | | 702/9 |
| 9,678,237 B2* | 6/2017 | Wu | G01V 3/08 |
| 9,702,240 B2 | 7/2017 | Bittar et al. | |
| 9,791,586 B2* | 10/2017 | Bittar | E21B 47/026 |
| 10,024,104 B2 | 7/2018 | Wu et al. | |
| 10,823,871 B2 | 11/2020 | Donderici | |
| 11,299,978 B2* | 4/2022 | Song | G01V 20/00 |
| 11,306,582 B2* | 4/2022 | Thiel | E21B 47/125 |
| 11,339,650 B2* | 5/2022 | Bittar | E21B 47/04 |
| 2011/0133740 A1 | 6/2011 | Seydoux et al. | |
| 2012/0199394 A1* | 8/2012 | Bittar | E21B 47/026 |
| | | | 175/45 |
| 2012/0298420 A1 | 11/2012 | Seydoux et al. | |
| 2013/0105224 A1* | 5/2013 | Donderici | G01V 3/12 |
| | | | 175/45 |
| 2013/0140088 A1* | 6/2013 | Williams | E21B 7/06 |
| | | | 175/45 |
| 2014/0249754 A1 | 9/2014 | Donderici et al. | |
| 2014/0350858 A1 | 11/2014 | Donderici | |
| 2015/0240629 A1* | 8/2015 | Wu | G01V 3/34 |
| | | | 702/11 |
| 2016/0223704 A1 | 8/2016 | Donderici et al. | |
| 2017/0306701 A1 | 10/2017 | Wu et al. | |
| 2019/0128116 A1 | 5/2019 | Thiel et al. | |
| 2019/0383961 A1 | 12/2019 | Dong et al. | |
| 2020/0408950 A1* | 12/2020 | Pan | G01V 3/26 |
| 2021/0047921 A1* | 2/2021 | Bittar | G01V 11/00 |
| 2021/0055447 A1 | 2/2021 | Dong et al. | |
| 2021/0231005 A1* | 7/2021 | Vehra | H04L 12/40182 |

OTHER PUBLICATIONS

Khemissa et al. "Ultra-Deep Resistivity Technology as a Solution for Efficient Well Placement; Geosteering and Fluid Mapping to Reduce Reservoir Uncertainty and Eliminate Pilot Hole-First Time Offshore Abu Dhabi, UAE" SPE-203435-MS (Year: 2020).*
ISRWO International Search Report and Written Opinion for PCT/US2018/062641 dated Aug. 12, 2019.
Office Action Summary for U.S. Appl. No. 16/606,696 dated Jun. 11, 2021.
Notice of Allowance for U.S. Appl. No. 16/606,696 dated Sep. 1, 2021.

* cited by examiner

LOOK-AHEAD RESISTIVITY CONFIGURATION

BACKGROUND

Wellbores drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. However, often subterranean formation may be below a bottom hole assembly during drilling operations. Thus, the subterranean formation may not be identified until after the bottom hole assembly has passed the subterranean formation because a drill bit disposed below the bottom assembly may block and/or prevent measurements from being taken below the drill bit. Knowing subterranean formation properties below the drill bit may help an operator steer the drilling system to a subterranean formation for recovering desirable fluids.

By "looking-ahead" of the drill bit, an operator may be able to steer the drilling system, which may reduce time, wear and tear on the drilling system, and money during drilling operations. In a drilling operation, or a measurement system, being able to "looking-ahead" may also prevent drilling operations from drilling into potential hazards. Currently, the ability to "look-ahead" presents problems and challenges that have not effectively been solved in the industry, specifically the ability to produce a high quality image of subterranean formation properties below a drill bit. Thus, a bottom hole assembly that is able to accurately produce a high quality image of subterranean formation properties below a drill may be desirable.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to a system and method of a bottom hole assembly tool configuration disposed about a drill bit for "look-ahead" resistivity applications (at least one hundred feet ahead (thirty and a half meters) that may be below the drill bit. As discussed below, an array of antennas that may operate at multiple frequencies to address the challenges of look-ahead inversions. Additionally, a unique dip meter tool may also be included in the antenna array to determine very shallow measurements around the drill bit.

Figure 1:
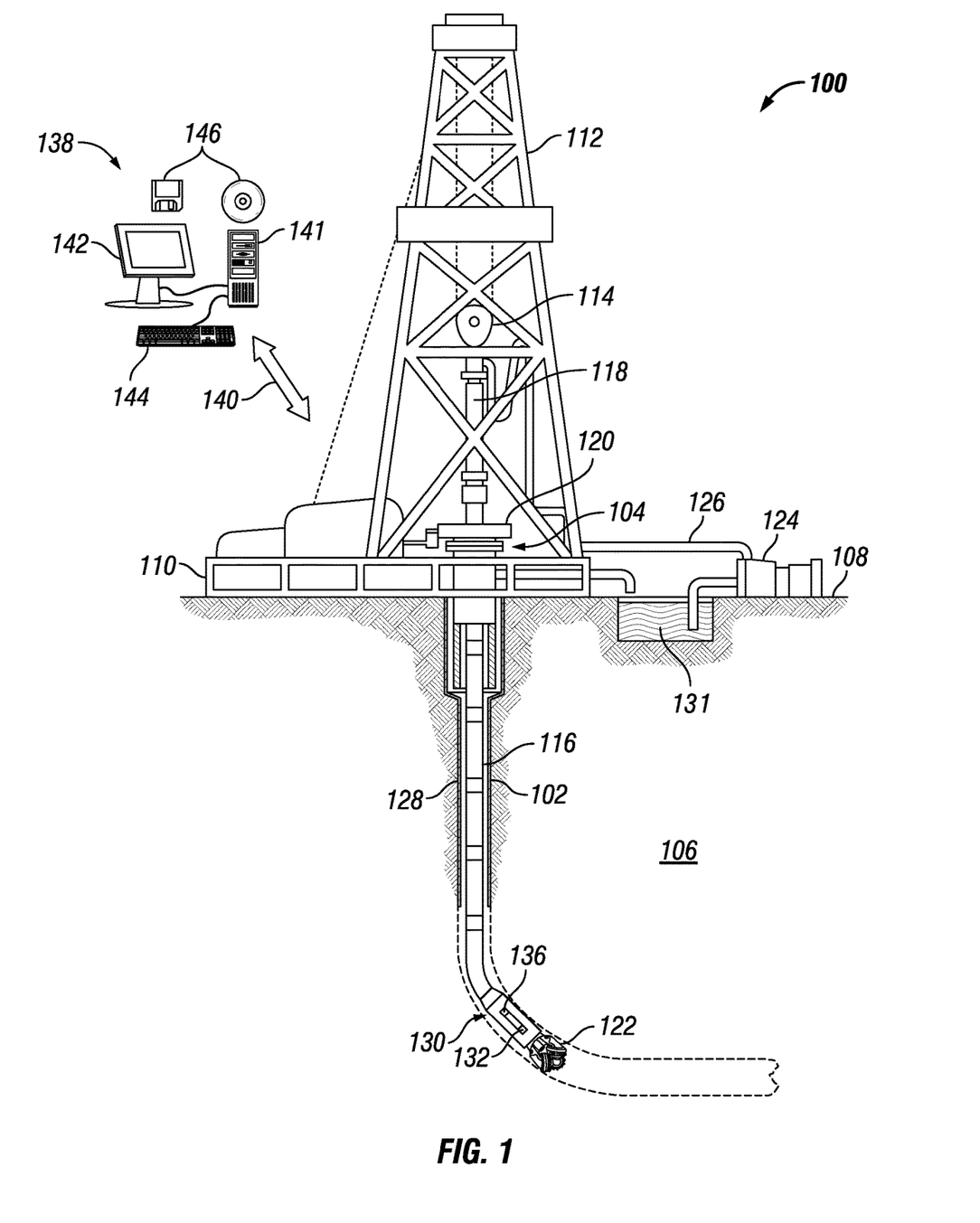
FIG. 1 illustrates an example of a drilling system.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extending generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 131.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Look-ahead resistivity tools may include an ultra-deep transmitter 132, a shallow tool 134, and/or an ultra-deep receiver 136. It should be noted that there may be any number of ultra-deep transmitters 132, any number of shallow tools 134, and/or any number of ultra-deep receivers 136 disposed on bottom hole assembly 130. In examples, ultra-deep transmitter 132, a shallow tool 134, and/or an ultra-deep receiver 136 may have any suitable spacing between each tool and may be disposed on different assemblies that may make up bottom hole assembly 130.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106.

Figure 2:
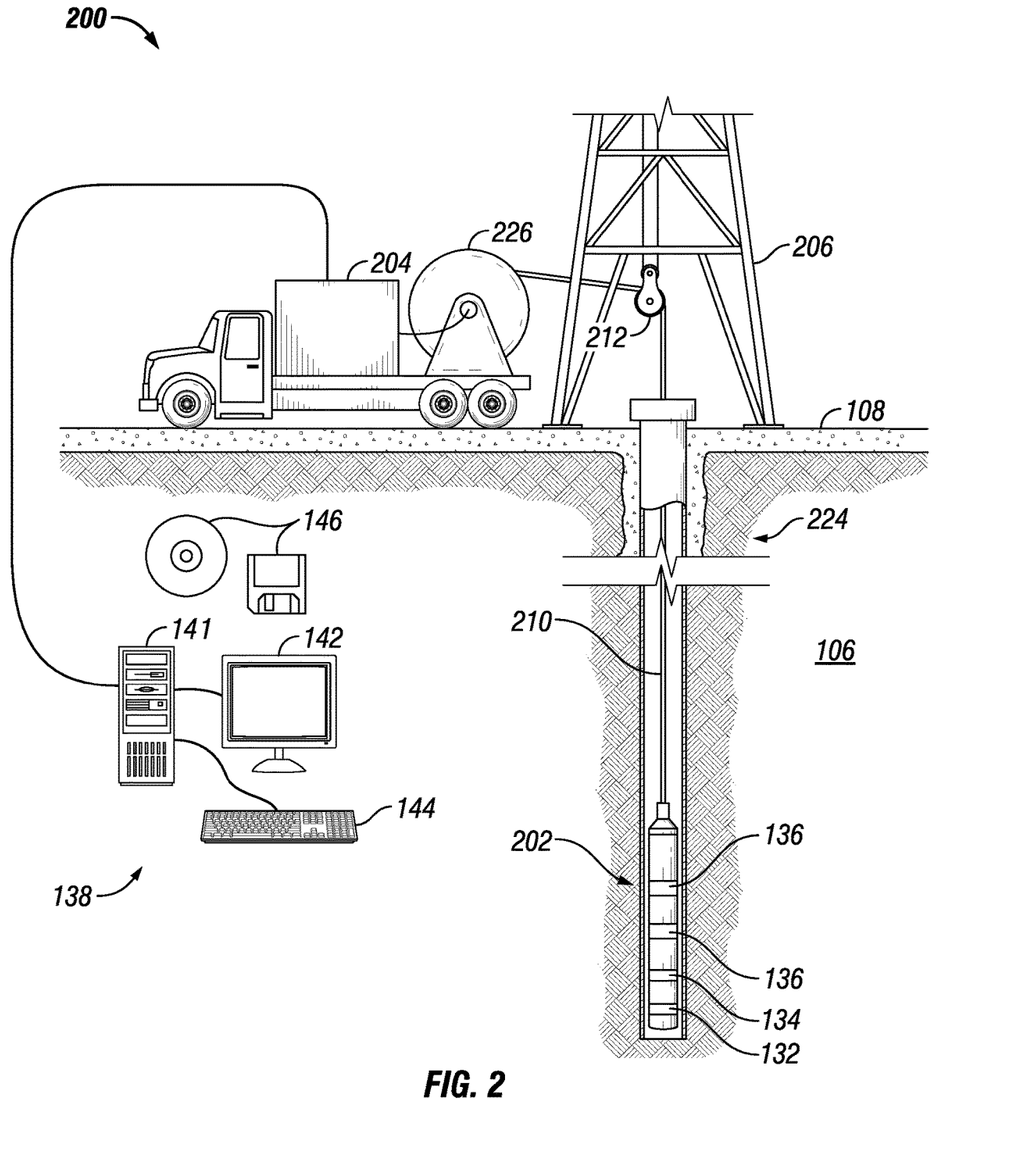
FIG. 2 illustrates an example of a well measurement system.

FIG. 2 illustrates a cross-sectional view of a well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produce in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 138 may comprise a safety valve (not illustrated) which controls the hydraulic pressure that drives drum 226 on vehicle 204 which may reels up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

Downhole tool 202 may include tools for look-ahead resistivity measurements. For example, look-ahead resistivity tools may include an ultra-deep transmitter 132, a shallow tool 134, and/or an ultra-deep receiver 136. It should be noted that there may be any number of ultra-deep transmitters 132, any number of shallow tools 134, and/or any number of ultra-deep receivers 136 disposed on bottom hole assembly 130. In examples, ultra-deep transmitter 132, a shallow tool 134, and/or an ultra-deep receiver 136 may have any suitable spacing between each tool and may be disposed on different assemblies that may make up bottom hole assembly 130. In examples, downhole tool 202 may operate with additional equipment (not illustrated, i.e. shakers and equipment for producing shots) on surface 108 and/or disposed in a separate well measurement system (not illustrated) to record measurements and/or values from subterranean formation 106.

Figure 3:
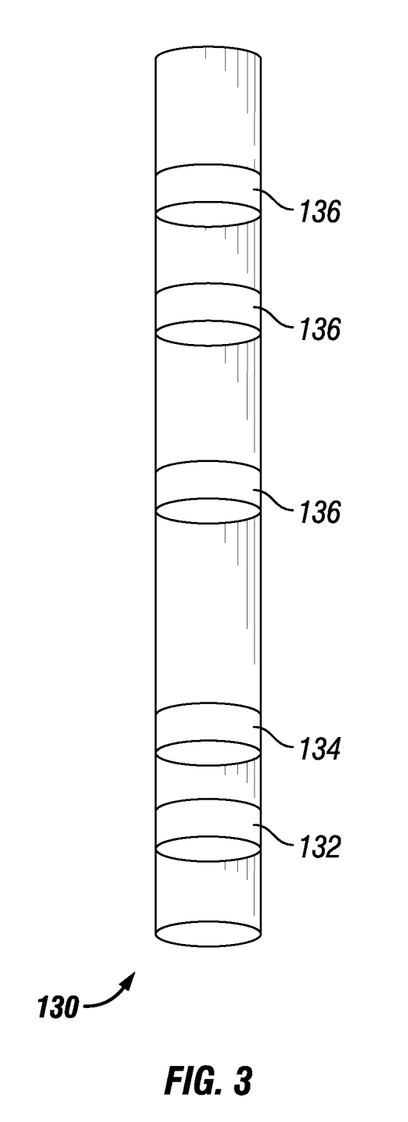
FIG. 3 illustrates an example of a bottom hole assembly.

FIG. 3 presents a general tool configuration for bottom hole assembly 130 (Referring to FIG. 1). It should be noted that the general tool configuration may be representative of downhole tool 202 (Referring to FIG. 2). In examples, bottom hole assembly 130 may function and/or operate as a look-ahead look-around electromagnetic tool. Bottom hole assembly 130 may include ultra-deep transmitter 132, a shallow tool 134, and/or an ultra-deep. It should be noted that the ultra-deep transmitter 132 may transmit any number of frequencies along any number receiver 136. Ultra-deep transmitter 132, which may be an antenna, may operate and function to transmit a low frequency signal, wherein the low frequency signal may range from about 1 KHz to about 250 KHz. of channels sequentially and/or simultaneously. Shallow tool 134 may operate and function to transmit a high frequency signal, wherein the high frequency signal may range from about 250 KHz to about 2 MHz. It should be noted that the shallow tool 134 may transmit any number of frequencies on any number of channels sequentially and/or simultaneously. Furthermore, in examples ultra-deep transmitter 132 and shallow tool 134 may be the same device and transmit high frequency signal and low frequency signal sequentially and/or simultaneously on any number of channels at any number of frequencies or range of frequencies. As illustrated, ultra-deep receivers 136 may be antennas which may receive reflected low frequency signals which may have been transmitted from ultra-deep transmitter 132. The reflected low frequency signals may be a signal that has been transmitted by the ultra-deep transmitter 133 into a formation and reflected of the formation back to ultra-deep receiver 136.

As illustrated there may be a plurality of ultra-deep receivers 136. In examples, shallow tool 134 and ultra-deep transmitter 132 may be disposed on a first assembly of bottom hole assembly 130 and ultra-deep receivers 136 may be disposed on a second assembly of bottom hole assembly 130. It should be noted that any number of ultra-deep receivers 136 may be disposed on any number of separate assemblies that may be a part of bottom hole assembly 130.

In examples, ultra-deep transmitter 132 and shallow tool 134 may be disposed on a bottom hole assembly 130, a sub assembly, a collar, and/or the like. Without limitation, ultra-deep transmitter 132 and shallow tool 134 may be disposed on different devices. For example, ultra-deep transmitter 132 may be disposed on bottom hole assembly 130 and shallow tool 134 may be disposed on a sub assembly, or vice versa. Ultra-deep transmitter 132 may be disposed on a first collar and shallow tool 134 may be disposed on a second collar. Ultra-deep transmitter 132 may be disposed on a collar and shallow tool 134 may be disposed on a sub assembly, or vice versa.

As illustrated in FIG. 3, shallow tool 134, which may have a short detection range, may be installed with ultra-deep transmitter 132 and/or ultra-deep receivers 136. Shallow measurements may allow an operator to determine shallow layer geological information, which may include distance to bed boundary layers nearby, subterranean formation resistivities (Vertical Resistivity, Rv, and Horizontal Resistivity, Rh), subterranean formation anisotropy, relative dip angle (dip) between subterranean formation structures, and drilling direction of drilling system 100. Without limitation, shallow measurements may be obtained within a range of from about one foot to about twenty feet from wellbore 102 (Referring to FIG. 1). Determining these shallow layers may be placed interpreted with a look-ahead inversion scheme, which may constrain the look-ahead inversion scheme with valuable prior information.

In addition, ultra-deep receiver 136 and ultra-deep transmitter 132 may be disposed on bottom hole assembly 130. Ultra-deep receiver 136 may be able to record signals generated by ultra-deep transmitter 132 that have reflected off of subterranean formation 106 (Referring to FIG. 1). In examples, these ultra-deep measurements may be reflected back to ultra-deep receiver 136 when encountering subterranean formation 106 from about twenty feet to about five hundred feet from wellbore 102. As depicted, ultra-deep transmitter 132 and shallow tool 134 may be disposed in a collar in any suitable fashion. In alternate examples, ultra-deep transmitter 132 may be a collar and/or sub and shallow tool 134 may be disposed on ultra-deep transmitter 132. In further examples, ultra-deep transmitter 132 may be disposed on a separate collar from shallow tool 134. The shallow measurements in combination with ultra-deep measurements may provide a more accurate inversion scheme.

Figure 4:
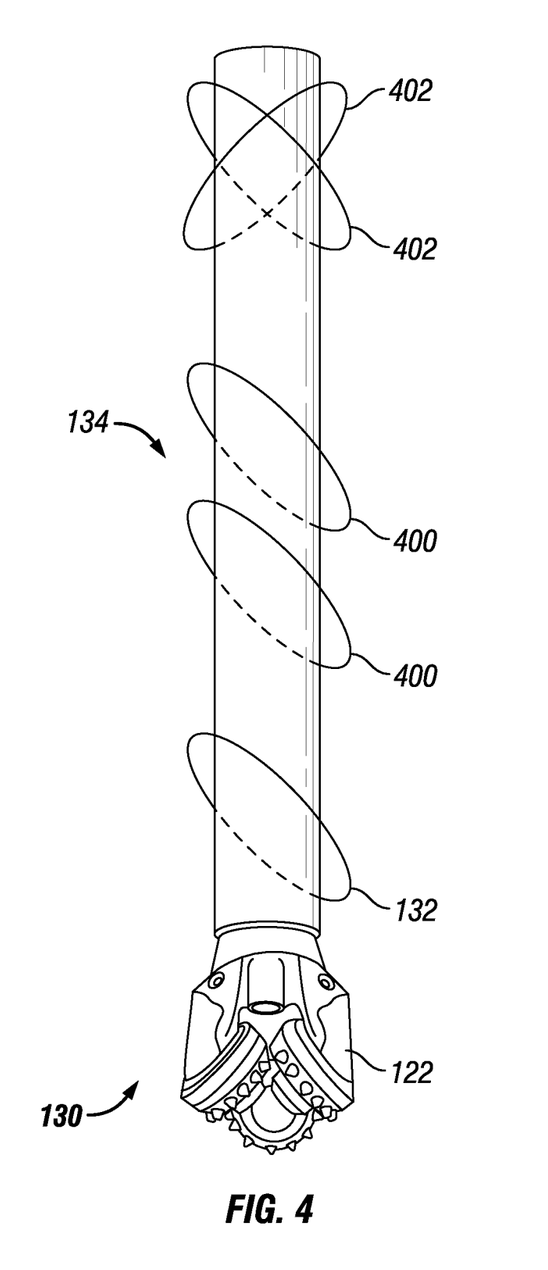
FIG. 4 illustrates another example of a bottom hole assembly.

FIG. 4 illustrates an example of bottom hole assembly 130 for a look-ahead resistivity configuration that may be disposed close to drill bit 122. In examples, ultra-deep transmitter 132 may transmit a very low frequency signals for deep detection capability. Without limitation, ultra-deep transmitter 132 may be disposed at about a foot (0.3048 meter) from drill bit 122 on the axis of bottom hole assembly 130. In examples, ultra-deep transmitter 132 may be disposed from drill bit 122 about two feet (0.6096 meter) to about ten feet (3.048 meters), about five feet (1.524 meters) to about twenty feet (6.096 meters), or about fifteen feet (4.572 meters) to about thirty feet (9.144 meters).

At least one shallow range transmitter 400, which may form shallow tool 134, may transmit high frequency signals into a formation. In examples, shallow range transmitter 400 may be disposed on the axis of bottom hole assembly 130 from drill bit 122 at about five feet (1.524 meters) to about twenty feet (6.096 meters), about fifteen feet (4.572 meters) to about thirty feet (9.144 meters), or about twenty five feet (7.62 meters) to about forty feet (12.192 meters). It should be noted that ultra-deep transmitter 132 may be disposed between drill bit 122 and shallow range transmitter 400. In examples, shallow range transmitter 400 may be disposed between ultra-deep transmitter 132 and drill bit 122. Without limitation ultra-deep transmitter 132 may be separated from shallow range transmitter 400 by about a foot (0.3048 meter), about two feet (0.6096 meter) to about ten feet (3.048 meters), or about five feet (1.524 meters) to about twenty feet (6.096 meters).

A reflected high frequency signals may be reflected back to a pair of receivers 402 that are collocated together on the bottom hole assembly 130. Collocated receiver 402 may function and/or operate to record multiple frequencies. This may allow for measurement and identification of the dip meter & resistivity anisotropy ahead of drill bit 122. In examples, there may be any number of suitable collocated receivers 402. It should be noted that collocated receivers 402 may be disposed adjacent to drill bit 122. For example, about a foot (0.3048 meter) from drill bit 122 on the axis of bottom hole assembly 130. Additionally, about two feet (0.6096 meter) to about ten feet (3.048 meters) or about five feet (1.524 meters) to about twenty feet (6.096 meters). In examples, collocated receivers 402 may be disposed a great distances from drill bit 122. Without limitation, about fifty feet (15.24 meters) to about one hundred feet (30.48 meters), about seventy five feet (22.86 meters) to about one hundred and fifty feet (45.72 meters), or about one hundred and twenty five feet (38.1 meters) to about two hundred feet (60.96 meters).

In examples, this may allow a multifrequency/multi-spacing array of shallow range transmitters 400 to decouple properties of subterranean formation 106 (Referring to FIG. 1) over a short detection range, including subterranean formation resistivities, subterranean formation anisotropy, subterranean formation dip angle and distance to bed boundary for layers near wellbore 102 (Referring to FIG. 1). Collocated receivers 402 may enable the decoupling of all multicomponent signals from shallow range transmitters 400 so that properties of subterranean formation 106 may be accurately determined. Once a shallow subterranean formation information may be evaluated, ultra-deep transmitter 132 may generate and transmit low frequency signals to subterranean formation 106, which may be reflected and received by collocated receivers 402. In examples, collocated receivers 402 may be disposed further away from drill bit 122 than ultra-deep transmitter 132. This may allow received signals to look-ahead and look-around drill bit 122 simultaneously.

It should be noted that the devices ultra-deep transmitter 132, shallow tool 134, ultra-deep receiver 136, and collocated receiver 402 may be antennas. This may allow any device to selectively function and operate as a transmitter and/or receiver at a high frequency signal or a low frequency signal. For example, shallow tool 134 may be an antenna that is also ultra-deep transmitter 132. The antenna may operate and function in two different modes, allowing the antenna to transmit the high frequency signal and the low frequency signal. Additionally, shallow tool 134 may be a first antenna and the ultra-deep transmitter 132 may be a second antenna. During operations, the first antenna may transmit a signal and the second antenna may operate as a receiver, or vice versa. This may allow any antenna or any number of antennas to operate as transmitters or receivers. For example, a first antenna may transmit a low frequency signal as ultra-deep transmitter 132 and shallow tool 134 and collocated receivers 402 may operate and function as ultra-deep receiver 136 or vice versa. This may allow an operator to record a reflected high frequency signal or a reflected low frequency signal at any point along bottom hole assembly 130 or drill string 116 (e.g., referring to FIG. 1).

Due to shallow range measurements, two types of inversions may be performed. First, shallow measurements and deep measurements for a look-around inversion may be conducted. In examples, a shallow measurement may be recorded as a first signal and an ultra-deep measurement may be recorded as a second signal. Then, the inversion may be recalculated in a look-ahead inversion. The look-ahead inversion may determine a look-ahead resistivity that may be based on the look-around inversion results and the shallow subterranean formation information measured by collocated receivers 402. In examples, certain constrains may be applied to the two inversion schemes so that each inversion scheme may focus on look ahead signals and invert subterranean formation properties ahead of drill bit 122. In addition, collocated receiver 402 may receive signals from ultra-deep transmitter 132 and decouple subterranean formation properties over medium detection range. Medium range measurements may further be used in the two inversion schemes.

Figure 5:
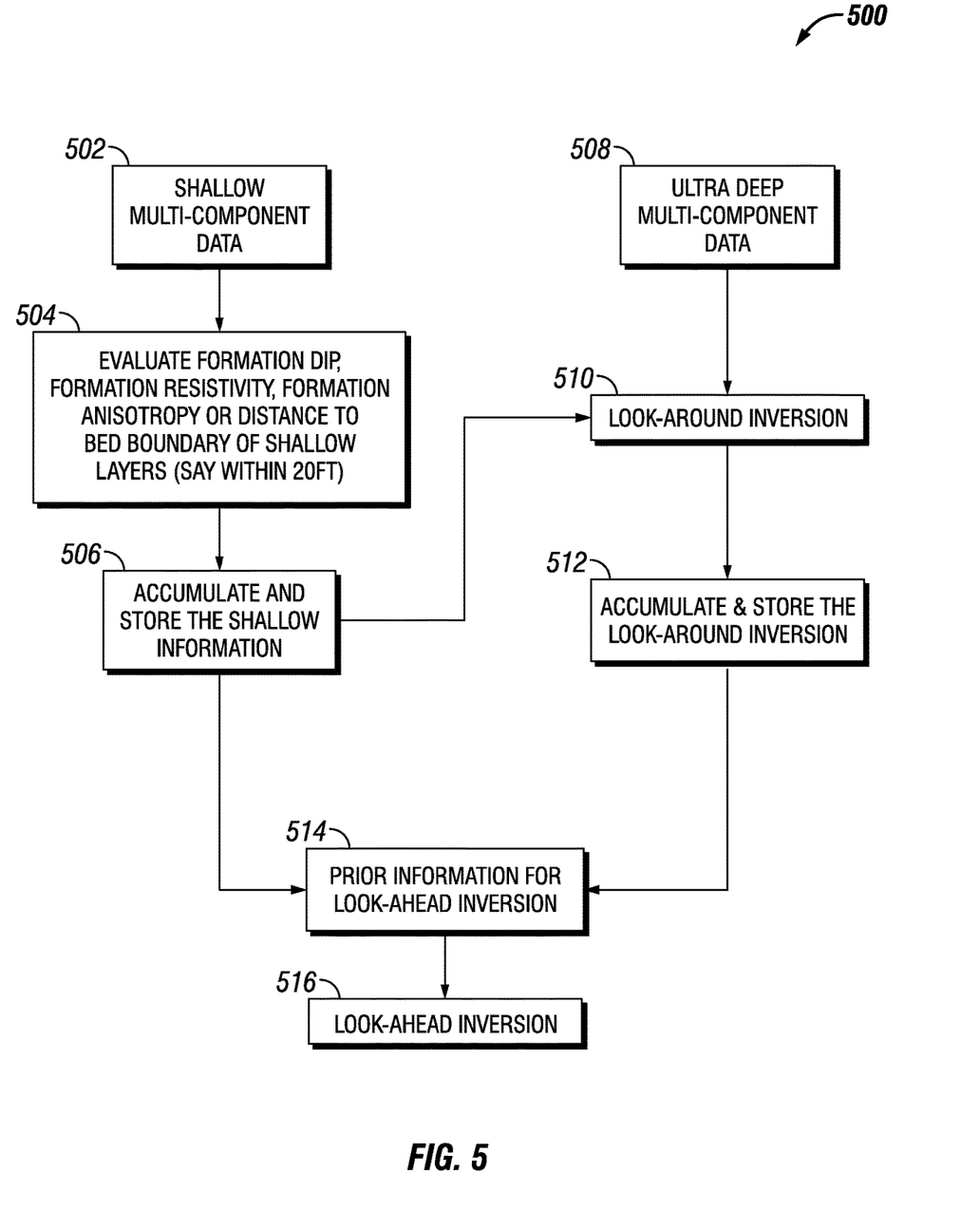
FIG. 5 illustrates an inversion and measurement workflow.

FIG. 5 illustrates an inversion and measurement workflow 500 for the two inversion schemes. Inversion and measurement workflow 500 may begin with step 502. In step 502, shallow range transmitters 400 (Referring to FIG. 4) may transmit signals to at least one subterranean formation 106 (Referring to FIG. 1) and collate receivers 402 may record the reflected high frequency signals reflect from the at least one subterranean formation 106. Recorded signals may comprise shallow multi-component data. Such measurements may directly be used to decouple shallow multicomponent signals each having different sensitivity orientation related to a subterranean formation 106.

The decoupled shallow multi-component signals from step 502 may be evaluated by an information handling system 138 (Referring to FIG. 1) in step 504 to find a subterranean formation dip angle, subterranean formation resistivity and anisotropy, and/or distance to bed boundary of shallow subterranean formation layers surrounding wellbore 102 (e.g., for a distance up to twenty feet (about six meters). In step 506, measurements of shallow subterranean formation layers found in step 504 may be accumulated, recorded, and/or stored in information handling system 138.

During the process of measuring and evaluating shallow subterranean formation layer information, step 508 may be performed concurrently and/or after shallow subterranean formation layer information has been measured and/or evaluated. In step 508, ultra-deep transmitter 132 (Referring to FIG. 4) may transmit signals to at least one subterranean formation 106 (Referring to FIG. 1) and collate receivers 402 (or ultra-deep receivers 136 [e.g., Referring to FIG. 3]) may record a reflected low frequency signal reflect from the at least one subterranean formation 106. Recorded signals may comprise ultra-deep multi-component signal. Such measurements may directly be used in step 510. In step 510, information from step 506 and step 508 may be combined in a look-around inversion. The look-around inversion may combine ultra-deep multicomponent data and accumulated and stored shallow subterranean formation layer information from step 506. It should be noted that information handling system 138 may perform the look-around inversion in step 510. Additionally, the evaluated data from step 506 may be accumulated and stored in information handling system 138 in step 512.

Accumulated and stored shallow subterranean formation layer information in step 506 and accumulated and stored look-around inversion data from step 512 may be combined in step 514 using information handling system 138 (Referring to FIG. 1). In step 514 the information and data from steps 506 and 512 may be prepared for evaluating by a look-ahead inversion in step 516. In step 516, information handling system 138 may perform the look-ahead inversion with information and data from step 514. As at least a portion of received signals are from properties of subterranean formation 106 around the wellbore 102, the look-around inversion in step 512 may identify a subterranean formation boundary surrounding wellbore 102. The look-ahead inversion may utilize the accumulated shallow subterranean formation layer information from step 506 to improve the inversion of ultra-deep layers of subterranean formation 106 around wellbore 102. It should be noted that both shallow subterranean formation layer information from step 506 and look-around inversion results from step 512 may be stored and accumulated in the process downhole or at surface. Accumulated information may be utilized to generate prior information of geology models surrounding wellbore 102. This may improve the look-ahead inversion in step 516 by constraining the look-ahead inversion to subterranean formation properties ahead of bottom hole assembly 130. The look-ahead inversion may generate a geology model of formation properties in front of the drill bit and the bottom hole assembly. An information handling system may then provide steering instructions to the operator or autonomously provide steering instructions to the bottom hole assembly to guide the bottom hole assembly and drill bit to desirable subterranean formation zones or avoid any drilling activity to a hazard zone.

Examples of bottom hole assembly 130 in FIGS. 3 and 4 may provide real-time dip measurements and resistivity anisotropy measurements as well as ultra-deep measurements may allow for look-ahead signals that may provide information on subterranean formation properties approximated to drill bit 122. These measurements may enable look-ahead capabilities approximate drill bit 122, which may be beneficial for operators and/or clients to proactively steer drill string 116 (Referring to FIG. 1) to any desirable subterranean formation zones (such as reservoir) and/or to avoid any drilling activity to a hazard zone (such as water). Shallow measurements taken, such as (Rh, Rv, and dip) with ultra-deep transmitter 132 may provide a better and more accurate look, or picture, ahead of drill bit 122.

Being able to "look ahead" of drill bit 122 may allow for precise control of drill operations. For example, an operator may steer drill bit 122 and bottom holes assembly 130 to any desirable subterranean formation zones (such as reservoir) and/or to avoid any drilling activity to a hazard zone (such as water).

This method and system may include any of the various features of the compositions, methods, and system disclosed herein, including one or more of the following statements.

Statement 1. A bottom hole assembly may comprise an ultra-deep transmitter operable to transmit a low frequency signal of about 1 KHz to about 250 KHz into a formation at a depth of about 20 feet to about 500 feet; a shallow tool operable to transmit a high frequency signal of about 250 KHz to about 2 MHZ into the formation at a depth of about 1 foot to about 20 feet; at least one ultra-deep receiver operable to record a reflected low frequency signal; and at least one pair of collocated receivers, wherein the at least one pair of collocated receivers are operable to record a reflected high frequency signal.

Statement 2. The bottom hole assembly of statement 1, further comprising a drill bit.

Statement 3. The bottom hole assembly of any previous statement, wherein the ultra-deep transmitter is disposed at about one foot from the drill bit.

Statement 4. The bottom hole assembly of any previous statement, wherein the shallow tool is disposed at about ten feet from the drill bit.

Statement 5. The bottom hole assembly of any previous statement, further comprising a first assembly and a second assembly.

Statement 6. The bottom hole assembly of statement 5, wherein the ultra-deep transmitter and the shallow tool are disposed on the first assembly and wherein the at least one ultra-deep receiver is disposed on the second assembly.

Statement 7. The bottom hole assembly of statements 1 to 5, wherein the shallow tool comprises at least two shallow range transmitters.

Statement 8. A well measurement system may comprise a conveyance; an ultra-deep transmitter operable to transmit a low frequency signal of about 1 KHz to about 250 KHz into a formation at a depth of about 20 feet to about 500 feet; a shallow tool operable to transmit a high frequency signal of about 250 KHz to about 2 MHZ into the formation at a depth of about 1 foot to about 20 feet; at least one ultra-deep receiver operable to record a reflected low frequency signal; at least one pair of collocated receivers, wherein the at least one pair of collocated receivers are operable to record a reflected high frequency signal; drill bit; and an information handling system. The information handling system may be configured to determine a decoupled shallow multi-component signal to determine a subterranean formation dip angle, a subterranean formation resistivity and anisotropy, or a distance to a bed boundary of a shallow subterranean formation layer from the reflected high frequency signal of shallow formation layers; perform a look-around inversion with at least the decoupled shallow multi-component signal and ultra-deep multi-component signal to determine properties of ultra-deep formation layers; perform a look-ahead inversion from the look-around inversion and the decoupled shallow multi-component signal to generate a geology model of formation properties in front of the bottom hole assembly and the drill bit; and provide steering instructions to the bottom hole assembly, wherein the steering instructions guide the bottom hole assembly and the drill bit to any desirable subterranean formation zones or avoid any drilling activity to a hazard zone.

Statement 9. The well measurement system of statement 8, further comprising a first assembly and a second assembly.

Statement 10. The well measurement system of statements 8 or 9, wherein the ultra-deep transmitter and the shallow tool are disposed on the first assembly and wherein the at least one ultra-deep receiver is disposed on the second assembly.

Statement 11. The well measurement system of statements 8 to 10, wherein the ultra-deep transmitter is disposed at about one foot from the drill bit and wherein the shallow tool is disposed at about ten feet from the drill bit.

Statement 12. A method to look-ahead of a drill bit may comprise disposing a bottom hole assembly into a wellbore. The bottom hole assembly may comprise an ultra-deep transmitter operable to transmit a low frequency signal of about 1 KHz to about 250 KHz into a formation at a depth of about 20 feet to about 500 feet; a shallow tool operable to transmit a high frequency signal of about 250 KHz to about 2 MHZ into the formation at a depth of about 1 foot to about 20 feet; at least one ultra-deep receiver operable to record a reflected low frequency signal; at least one pair of collocated receivers, wherein the at least one pair of collocated receivers are operable to record a reflected high frequency signal; and a drill bit. The method may further comprise transmitting a high frequency signal from the shallow tool into the formation; recording a reflected high frequency signal with the at least one pair of collocated receivers; transmitting a low frequency signal from the ultra-deep transmitter into the formation; recording a reflected low frequency signal with the at least one ultra-deep receiver; evaluating the reflected high frequency signal and the reflected low frequency signal on an information handling system with a look-ahead inversion; determining a subterranean formation property in front of the drill bit with the look-ahead inversion; and steering the bottom hole assembly in the formation based on the subterranean formation property.

Statement 13. The method of statement 12, wherein the first signal is a shallow multi-component information and wherein the second signal is an ultra-deep multi-component data.

Statement 14. The method of statements 12 or 13, further comprising performing a look-around inversion with the information handling system with the ultra-deep multi-component data and the shallow multi-component information.

Statement 15. The method of statements 12 to 14, comprising performing a look-ahead inversion with the information handling system with the shallow multi-component information and the look-around inversion.

Statement 16. The method of statement 12, wherein the first signal is a shallow multi-component information that comprises a subterranean formation dip, subterranean formation resistivity, formation anisotropy, or a distance to a bed boundary or a shallow subterranean formation.

Statement 17. The method of statement 12, wherein the at least one ultra-deep receiver comprises a collocated receiver.

Statement 18. The method of statements 12, 16 or 17, further comprising decoupling the first signal with the information handling system.

Statement 19. The method of statements 12, or 16 to 18, wherein the shallow tool comprises at least two shallow range transmitters.

Statement 20. The method of statements 12, or 16 to 19, wherein the ultra-deep transmitter and the shallow tool are disposed on the first assembly and wherein the at least one ultra-deep receiver is disposed on the second assembly.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A bottom hole assembly comprising:
   a drill bit;
   an ultra-deep transmitter configured to transmit a low frequency signal;
   a shallow tool configured to transmit a high frequency signal;
   at least one ultra-deep receiver operable to record a reflected low frequency signal;
   at least one pair of receivers, wherein the at least one pair of receivers are collocated such that the at least one pair of receivers operate together and are operable to record a reflected high frequency signal, and wherein the at least one pair of receivers are located adjacent to the drill bit to two hundred feet from the drill bit; and
   an information handling system wherein the information handling system is configured to:
      determine a decoupled shallow multi-component signal from the reflected high frequency signal;
      perform a look-around inversion with at least the decoupled shallow multi-component signal; and
      perform a look-ahead inversion from the look-around inversion and the decoupled shallow multi-component signal.

2. The bottom hole assembly of claim 1, wherein the ultra-deep transmitter is disposed at one foot from the drill bit and wherein the shallow tool is disposed at ten feet from the drill bit.

3. The bottom hole assembly of claim 1, wherein the shallow tool comprises at least two shallow range transmitters.

4. The bottom hole assembly of claim 1,
   wherein the information handling system is configured to:
      provide steering instructions to the bottom hole assembly, wherein the steering instructions guide the bottom hole assembly and the drill bit to any desirable subterranean formation zones or avoid any drilling activity to a hazard zone.

5. The bottom hole assembly of claim 1, wherein the low frequency signal is about 1 KHz to about 250 KHz for transmitting into a formation at a depth of about 20 feet to about 500 feet.

6. The bottom hole assembly of claim 1, wherein the high frequency signal is about 250 KHz to about 2 MHZ for transmitting into a formation at a depth of about 1 foot to about 20 feet.

7. The bottom hole assembly of claim 1, wherein the decoupled shallow multi component signal is used to determine a subterranean formation dip angle, a subterranean formation resistivity and anisotropy, or a distance to a bed boundary of a shallow subterranean formation layer from a reflected high frequency signal of shallow formation layers.

8. The bottom hole assembly of claim 1, further comprising a first assembly and a second assembly.

9. The bottom hole assembly of claim 8, wherein the ultra-deep transmitter and the shallow tool are disposed on the first assembly and wherein the at least one ultra-deep receiver is disposed on the second assembly.

10. A method comprising:
    disposing a bottom hole assembly into a wellbore, wherein the bottom hole assembly comprises:
       a drill bit;
       an ultra-deep transmitter configured to transmit a low frequency signal;
       a shallow tool configured to transmit a high frequency signal;
       at least one ultra-deep receiver operable to record a reflected low frequency signal; and
       at least one pair of receivers, wherein the at least one pair of receivers are collocated such that the at least one pair of receivers operate together and are operable to record a reflected high frequency signal, and wherein the at least one pair of receivers are located adjacent to the drill bit to two hundred feet from the drill bit;
    decoupling a shallow multi-component signal to determine a subterranean formation dip angle, a subterranean formation resistivity and anisotropy, or a distance to a bed boundary of a shallow subterranean formation layer from a reflected high frequency signal of shallow formation layers;
    performing a look-around inversion with at least the decoupled shallow multi-component signal and ultra-deep multi-component signal to determine properties of ultra-deep formation layers;
    performing a look-ahead inversion from the look-around inversion and the decoupled shallow multi-component signal to generate a geology model of formation properties in front of the bottom hole assembly and a drill bit; and
    providing steering instructions to the bottom hole assembly, wherein the steering instructions guide the bottom hole assembly and the drill bit to any desirable subterranean formation zones or avoid any drilling activity to a hazard zone.

11. The method of claim 10, wherein the shallow tool comprises at least two shallow range transmitters.

12. The method of claim 10, further comprising storing one or more look-around inversions.

13. The method of claim 10, wherein the low frequency signal is about 1 KHz to about 250 KHz for transmitting into a formation at a depth of about 20 feet to about 500 feet.

14. The method of claim 10, wherein the high frequency signal is about 250 KHz to about 2 MHZ for transmitting into a formation at a depth of about 1 foot to about 20 feet.

15. The method of claim 10, wherein the ultra-deep transmitter is disposed at one foot from the drill bit.

16. The method of claim 15, wherein the shallow tool is disposed at ten feet from the drill bit.

17. The method of claim 10, further comprising a first assembly and a second assembly.

18. The method of claim 17, wherein the ultra-deep transmitter and the shallow tool are disposed on the first assembly and wherein the at least one ultra-deep receiver is disposed on the second assembly.

* * * * *